United States Patent
Anderson et al.

(10) Patent No.: US 10,412,094 B2
(45) Date of Patent: Sep. 10, 2019

(54) PRIVILEGED, DIAGNOSTIC LINK CONNECTOR BASED NETWORK MONITORING CAPABILITIES WITHIN A VEHICLE EMPLOYING A GATEWAY MODULE USED TO ISOLATE AND SECURE VEHICLE NETWORKS

(71) Applicant: GM GLOBAL TECHNOLOGY OPERATIONS LLC, Detroit, MI (US)

(72) Inventors: Anthony Anderson, Macomb, MI (US); Joseph E. Ploucha, Commerce Township, MI (US); Kenneth M. Hromada, Sterling Heights, MI (US); Michael A. Sowa, Clinton Townshipn, MI (US); Natalie Ann Wienckowski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 15/605,658

(22) Filed: May 25, 2017

(65) Prior Publication Data

US 2018/0343262 A1  Nov. 29, 2018

(51) Int. Cl.
| | |
|---|---|
| *H04L 29/06* | (2006.01) |
| *B60R 16/023* | (2006.01) |
| *B60R 25/00* | (2013.01) |
| *H04W 12/06* | (2009.01) |
| *G07C 5/08* | (2006.01) |
| *H04L 12/40* | (2006.01) |
| *H04W 4/44* | (2018.01) |

(52) U.S. Cl.
CPC ........ *H04L 63/102* (2013.01); *B60R 16/0234* (2013.01); *B60R 25/00* (2013.01);
(Continued)

(58) Field of Classification Search
CPC ... H04L 29/06; H04L 63/102; H04L 41/0659; H04L 43/0847; H04L 43/045;
(Continued)

(56) References Cited

U.S. PATENT DOCUMENTS 7,225,065 B1 * 5/2007 Hunt .................. B60R 16/0207
701/33.2
8,601,170 B1 * 12/2013 Marr ..................... G06F 21/572
710/15
(Continued)

*Primary Examiner* — Venkat Perungavoor
*Assistant Examiner* — Khalid M Almaghayreh
(74) *Attorney, Agent, or Firm* — Lorenz & Kopf, LLP

(57) ABSTRACT

A system for providing privileged access to an internal vehicle communication network is provided. The system includes a presentation network bus configured to provide listen-only access to a subset of in-vehicle networks, a security system configured to enable access to the presentation network bus by verifying access credentials, and a diagnostic service system configured to control access to the presentation network bus. The diagnostic service system is configured to receive a diagnostic service request after the access credentials have been verified to enable the presentation network busses for listen-only access to the subset of the in-vehicle networks. The presentation network busses may be enabled for the listen-only access after credential verification by the security system and in response to receipt of a diagnostic service request from the diagnostic service system requesting that the presentation network busses be enabled.

20 Claims, 7 Drawing Sheets

(52) U.S. Cl.
CPC ........ *G07C 5/0808* (2013.01); *H04L 63/0823*
(2013.01); *H04W 12/06* (2013.01); *H04L
2012/40215* (2013.01); *H04W 4/44* (2018.02)

(58) Field of Classification Search
CPC .......................... H04L 43/0823; H04L 63/10;
H04L 63/1425; H04L 67/12; B60R
16/023; B60R 16/0234; B60R 25/00
USPC ........ 726/2, 4, 5, 7, 17–19, 21–22; 713/182,
713/502, 166, 176; 701/36, 75, 29.1,
701/31.5; 709/223–225
See application file for complete search history.

(56) References Cited

U.S. PATENT DOCUMENTS

| | | | |
|---|---|---|---|
| 9,616,828 B2* | 4/2017 | Ben Noon | ............ B60R 16/023 |
| 2002/0078345 A1* | 6/2002 | Sandhu | ................ H04L 9/0825 |
| | | | 713/155 |
| 2007/0152503 A1* | 7/2007 | Kowalick | .......... H01R 13/6397 |
| | | | 307/10.1 |
| 2008/0186870 A1* | 8/2008 | Butts | .................. H04L 41/0659 |
| | | | 370/252 |
| 2009/0278656 A1* | 11/2009 | Lopez | ..................... B60R 25/24 |
| | | | 340/5.72 |
| 2010/0083386 A1* | 4/2010 | Kline | ............. G01R 31/31705 |
| | | | 726/34 |
| 2010/0106809 A1* | 4/2010 | Grohman | ........... B60H 1/00642 |
| | | | 709/220 |
| 2013/0204484 A1* | 8/2013 | Ricci | ....................... G06F 17/00 |
| | | | 701/29.4 |
| 2015/0191135 A1* | 7/2015 | Ben Noon | ........... B60R 16/023 |
| | | | 726/22 |
| 2016/0012653 A1* | 1/2016 | Soroko | .............. G07C 9/00007 |
| | | | 340/5.61 |
| 2017/0093866 A1* | 3/2017 | Ben-Noon | ............ H04L 9/3234 |

* cited by examiner

PRIVILEGED, DIAGNOSTIC LINK CONNECTOR BASED NETWORK MONITORING CAPABILITIES WITHIN A VEHICLE EMPLOYING A GATEWAY MODULE USED TO ISOLATE AND SECURE VEHICLE NETWORKS

TECHNICAL FIELD

The technology described in this patent document relates generally to in-vehicle networks and more particularly to allowing privileged and secure, listen-only access to in-vehicle networks.

BACKGROUND

Modern vehicles (e.g., automobile, car, light truck, and others) employ various embedded electronic controllers that improve the performance, comfort, safety, etc. of the vehicle. Such controllers include engine controllers, suspension controllers, steering controllers, power train controllers, climate control controllers, infotainment system controllers, chassis system controllers, etc. These controllers communicate over in-vehicle networks such as a controller area network (CAN). Listening to the data traffic on an in-vehicle network when a vehicle system malfunctions can provide insights on what has malfunctioned and possible fixes. The lack of this feature may not always be optimal for development, validation, and field investigations but aligns with security strategies intending to prevent bad actors from easily monitoring and modifying vehicle functionality via otherwise accessible network interfaces.

Accordingly, it is desirable to provide a system that allows privileged and secure access for monitoring an in-vehicle network. Furthermore, other desirable features and characteristics of the present invention will become apparent from the subsequent detailed description of the invention and the appended claims, taken in conjunction with the accompanying drawings and the background of the invention.

SUMMARY

A system for providing privileged access to an internal vehicle communication network is provided. The system includes a presentation network bus configured to provide listen-only access to a subset of in-vehicle networks, a security system configured to enable access to the presentation network bus by verifying access credentials, and a diagnostic service system configured to control access to the presentation network bus. The diagnostic service system is configured to receive a diagnostic service request after the access credentials have been verified to enable the presentation network bus for listen-only access to the subset of networks. The presentation network bus may be enabled for the listen-only access after credential verification by the security system and in response to receipt of a diagnostic service request from the diagnostic service system requesting that the presentation network bus be enabled.

The presentation network bus in the system may be configured to provide a listen-only connection to one of the in-vehicle serial networks on a first set of pins of a diagnostic link connector (DLC) and a listen-only connection to a second one of the in-vehicle serial networks on a second set of pins of the DLC.

The system may further include presentation circuitry configured to mirror an in-vehicle network onto the presentation network bus.

The presentation circuitry in the system may include a network transceiver that is configured to transmit data onto the presentation network bus from the in-vehicle network for listen-only access to the in-vehicle network but not capable of receiving data from the presentation network bus to transmit onto the in-vehicle network.

The presentation circuitry in the system may include selection circuitry configured to selectively output one of a plurality of network receive lines of the in-vehicle serial networks to the presentation network bus.

The diagnostic service system may be further configured to enable a persistence mode after the access credentials have been verified wherein the presentation network bus will be enabled for listen-only access after a power-down and power-up cycle for a limited number of cycles without re-verifying access credentials in the security system after the power-down.

The diagnostic service system may be further configured to receive a diagnostic service request that requests that the persistence mode be enabled and includes a persistence count value that identifies the number of power-down and power-up cycles during which the presentation network bus will be enabled for listen-only access without re-verifying access credentials.

The persistence count value in the system may only be set to a value greater than zero during an operating cycle in which the access credentials have been verified in the security system.

A method of providing privileged access to an internal vehicle communication network is provided. The method includes providing a presentation network bus capable of providing listen-only access to a subset of in-vehicle networks, verifying access credentials in a security system configured to control access to the presentation network bus by using a combination of symmetric and asymmetric cryptographic systems, receiving a diagnostic service request after the access credentials have been verified to enable the presentation network bus for listen-only access to the subset of in-vehicle networks, and enabling the presentation network bus for the listen-only access in response to receipt of the diagnostic service request.

The method may further include receiving a second diagnostic service request after the presentation network bus has been enabled that identifies a different network for listen-only access.

The method may further include enabling a persistence mode after the access credentials have been verified wherein the presentation network bus will be enabled for listen-only access after a power-down and power-up cycle without re-verifying access credentials in the security system after the power-down.

Enabling a persistence mode in the method may include receiving a diagnostic service request that requests that the persistence mode be enabled and includes a persistence count value that identifies the number of power-down and power-up cycles during which the presentation network bus will be enabled for listen-only access without re-verifying access credentials.

The persistence count value in the method may automatically decrement after each power-down and power-up cycle.

The method may further include disabling the persistence mode after receiving a diagnostic service request to disable the persistence mode regardless of the persistence count value.

Disabling the persistence mode in the method may include resetting the persistence count value to zero.

The persistence count value in the method may only be set to a value greater than zero during an operating cycle in which the access credentials have been verified in the security system.

The method may further include providing one of a plurality of different listen-only access levels to the in-vehicle networks based on the received access credentials.

A gateway module in a vehicle is provided. The gateway module includes presentation circuitry configured to mirror a selected in-vehicle network onto a presentation network bus. The presentation circuitry includes selection circuitry configured to selectively output one of a plurality of network receive lines from in-vehicle serial networks to the presentation network bus and transceiver circuitry that is configured to transmit data onto the presentation network bus from the selected in-vehicle network for listen-only access to the in-vehicle network and prevent data from the presentation network bus from being transmitted onto the selected in-vehicle network. The gateway module further includes a security interface configured to enable access to the presentation network bus by verifying access credentials using a combination of symmetric and asymmetric cryptographic systems and a diagnostic service interface configured to control access to the presentation network bus wherein the diagnostic service interface is configured to receive a diagnostic service request after the access credentials have been verified to enable the presentation network bus for listen-only access to the selected in-vehicle network.

The diagnostic service interface in the gateway module may be further configured to enable a persistence mode after the access credentials have been verified wherein the presentation network bus will be enabled for listen-only access after a power-down and power-up cycle without re-verifying access credentials in the security system after the power-down.

The diagnostic service interface in the gateway module may be further configured to receive a diagnostic service request that requests that the persistence mode be enabled and includes a persistence count value that identifies the number of power-down and power-up cycles during which the presentation network bus will be enabled for listen-only access without re-verifying access credentials.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

A vehicle (e.g., automobile, car, light truck, and others) may have as many as 100 or more electronic control units (ECUs) for various subsystems. ECUs may be provided for the engine, transmission, airbags, antilock braking/ABS, cruise control, electric power steering, audio systems, power windows, doors, mirror adjustment, battery and recharging systems for hybrid/electric cars, and others. In-vehicle networks are provided that interconnect the different ECUs to other ECUs and other vehicle systems to allow a wide range of safety, economy and convenience features to be implemented using software. One in-vehicle network that may be provided is the controller area network (CAN), which may include eight busses, six for vehicle systems and two for providing diagnostic information to diagnostic tools via a diagnostic link connector (DLC). CAN busses interconnect different ECUs and other vehicle systems. A central gateway module (CGM) may be provided to gate signals from one CAN bus to another to interconnect the different ECUs.

Figure 1:
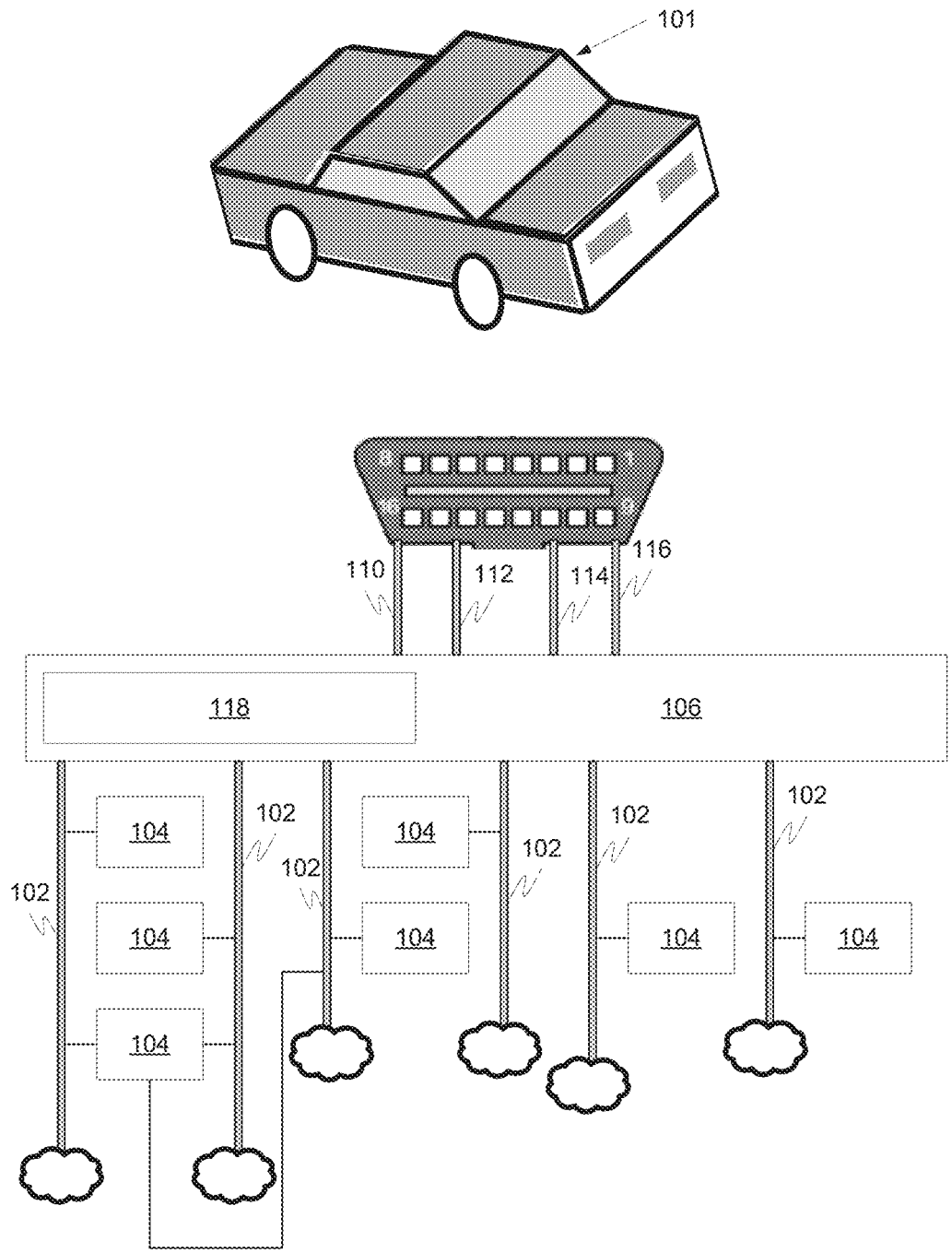
FIG. 1 is a block diagram depicting an example data network system in a vehicle, in accordance with some embodiments.

FIG. 1 is a block diagram depicting an example data network system 100 in a vehicle 101. The example data network system 100 includes an in-vehicle network comprising a plurality of in-vehicle network busses. The in-vehicle network busses in this example are CAN busses 102. The CAN busses are coupled to a plurality of nodes such as electronic control units (ECUs) 104. A central gateway module (CGM) 106 is provided as an ECU for data network management within the vehicle. The CGM 106 transmits data between busses of various vehicle domains, such as engine compartment bus, interior bus, optical multimedia bus and diagnostic bus for maintenance. The CGM 106 also transmits data on two diagnostic busses to the diagnostic link connector (DLC) 108. The DLC 108 is the multi-pin diagnostic connection port in vehicles, e.g., automobiles, trucks, and motorcycles, used to interface a diagnostic scan tool with the CGM 106 and to access on-board diagnostics.

Direct connectivity between in-vehicle networks and the DLC can present cybersecurity risks. For most classes of vehicle users, the associated security risks of direct connectivity outweigh the benefits. But for a small class of users, e.g., vehicle engineers, suppliers and manufacturers, direct connectivity may help with vehicle design and troubleshooting problems.

The CGM 106 in the example data network system 100 provides a first diagnostic CAN bus 110 and a second diagnostic CAN bus 112 to pins in the DLC 108 wherein each diagnostic CAN bus 110, 112 provides a scan tool interfaced with the DLC 108 with access to the CGM 106 and on-board diagnostics. The CGM 106 in the example data network system 100 further provides a first presentation network bus 114 to one pin in the DLC 108 and a second presentation network bus 116 to another pin in the DLC 108 wherein each presentation bus 114, 116, when enabled, provides a privileged, listen-only access to one of the CAN busses. The first and second presentation network busses 114, 116 are provided and enabled by a presentation capability physical layer and control algorithms 118 within the CGM 106.

Figure 2:
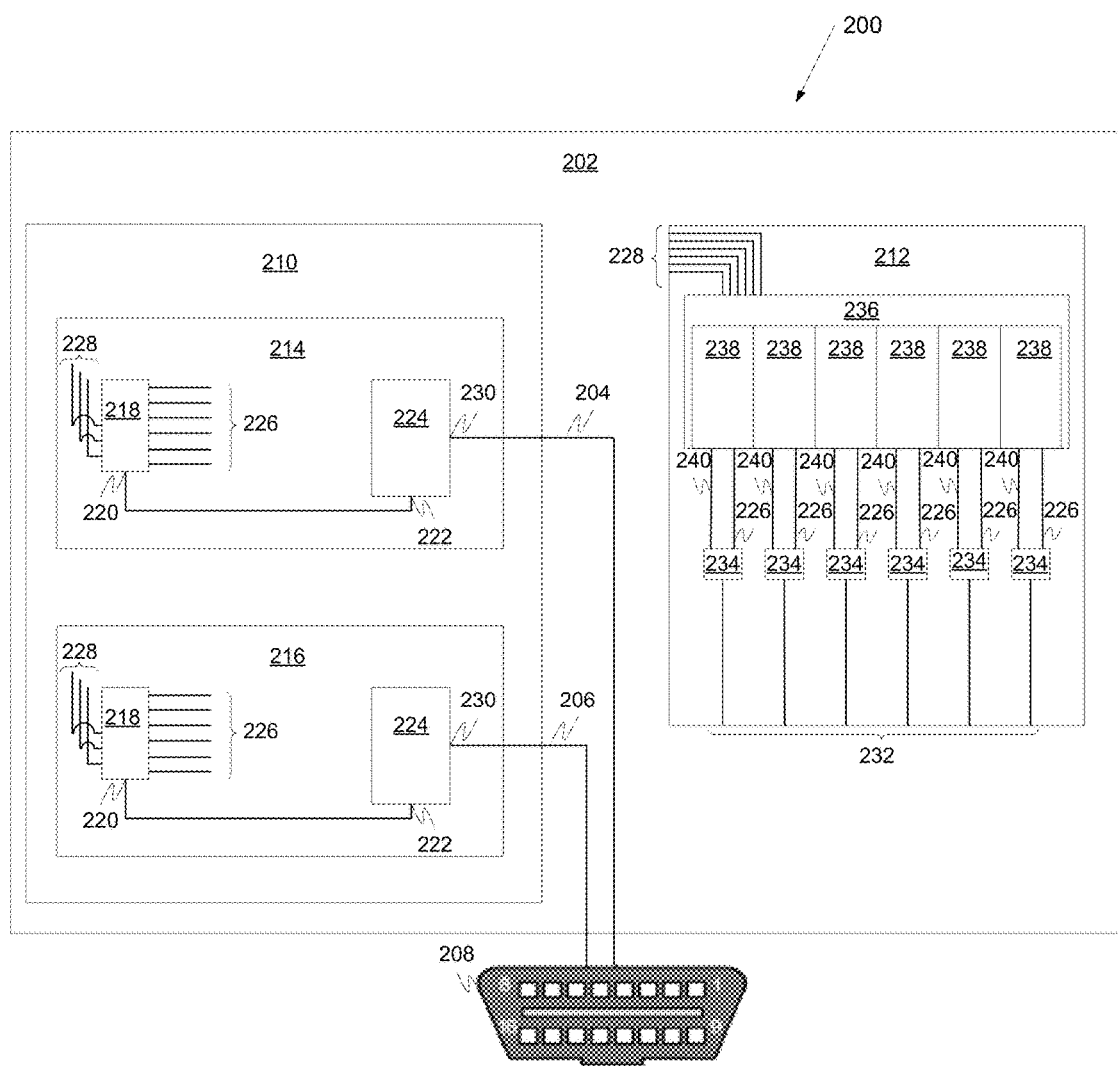
FIG. 2 is a block diagram depicting an example system that provides listen-only access to up to two in-vehicle network busses at a time, in accordance with some embodiments.

FIG. 2 is a block diagram depicting an example system 200 that includes an example ECU 202 that provides, via a first presentation network bus 204 and a second presentation network bus 206, pins of a DLC 208 with privileged, listen-only access to up to two CAN busses at a time. The example ECU 202 includes a presentation network block 210 and a diagnostic service block 212. The example presentation network block 210 is configured to provide the DLC 208 with listen-only access to data traffic on up to two CAN busses via the first presentation network bus 204 and the second presentation network bus 206. The diagnostic service block 212 configures access to, enables, and controls the functioning of the presentation network block 210.

The example presentation network block includes a first presentation circuit 214 and a second presentation circuit 216. Each example presentation circuit 214, 216 includes a multiplexer or data selector 218 with its output 220 coupled to the transmit data (TxD) input 222 of a transceiver 224. The multiplexer 218 in this example is an 8:1 multiplexer that is configured to select the receive data (RxD) line 226 from one of six CAN buses to output to the input of the transceiver 224. The RxD line selection is determined by selection signals 228 provided to the multiplexer 218.

The example transceiver 224 is configured with a RxD output and a TxD input 222. The TxD input 222 is coupled to the output 220 of the data selector 218, the RxD output is not used, and the transceiver output 230 is coupled to a pin of the DLC 208 via the first presentation network bus 204 or the second presentation network bus 206. Because the TxD input 222 of the example transceiver 224 is connected to the output 220 of the multiplexer 218 and the output 230 of the example transceiver 224 is connected to the DLC 208, the transceiver 224, when enabled, provides listen-only access to a selected CAN bus through a RxD line 226. The transceiver 224 is not configured to provide transmit access to any of the CAN busses or RxD lines 226.

The example diagnostic service block 212 connects with the vehicle CAN busses 232 via a plurality of transceivers 234 that adapt signal levels from the CAN busses 232 to levels on RxD lines that a CAN controller 238 expects and converts transmit signals on TxD lines received from the CAN controller 238 into a signal that can be sent onto the CAN busses 232. A transceiver 234 is provided for each CAN bus 232. The example diagnostic service block 212 also provides channel selection signals 228 from a microprocessor 236 to each multiplexer 218.

The example ECU 202 comprises a microprocessor 236 that, among other things, transmits data between the CAN busses 232 and transmits data on two diagnostic CAN busses to the DLC. The example ECU 202 includes a CAN controller 238 for each CAN bus 232. Each CAN controller 238 receives CAN BUS signals on an RxD line 226 and provides CAN bus signals on a TxD line 240. The RxD lines 226 are provided to the presentation network block 210.

The example ECU 202 is configured by programming instructions to individually or collectively enable each of the first presentation circuit 214 and the second presentation circuit 216 to present the data traffic on one of the CAN busses to the DLC. The example ECU 202 is configured by programming instructions to select the specific CAN busses to present on the first presentation network bus 204 and the second presentation network bus 206. The example ECU 202 is configured by programming instructions to implement a security protocol before enabling one or both of the first presentation network bus 204 and the second presentation network bus 206. The security protocol implemented in this example uses a combination of symmetric and asymmetric cryptography. An asymmetric cryptographic system, e.g., a public key infrastructure (PKI) system, is used for user credential controls and authentication of a user with a back-office certificate authority. Successful completion of the asymmetric cryptographic protocols results in a user being provided with security credentials that when provided to the ECU 202 allows a challenge and response handshake protocol between the ECU 202 and the back-office to be completed. Successful completion of the challenge and response handshake protocol allows the ECU 202 to provide listen-only data traffic from one of the CAN busses to one of the presentation network busses 204, 206.

The example ECU 202 is configured by programming instructions to grant different types of access to different classes of users. As an example, an engineer may belong to a first class of users and have one level of access, a supplier may belong to a second class of users and have a second level of access, and a manufacturer may belong to a third class of users and have a third level of access. Each class may be further broken down into subclasses with each class and subclass being entitled to a certain level of listen-only access to a presentation network bus.

The example ECU 202 utilizes one of the diagnostic CAN buses to receive security credentials from a user, resulting from the user completing asymmetric cryptographic protocols with the back-office certificate authority and receiving the security credentials from the back-office, before verifying the received security credentials and granting the user with access to a presentation network bus. The example ECU 202 also uses the diagnostic CAN bus to receive requests from a user to enable one or more of the presentation network busses, to select the channels that are presented on the presentation network bus, and to enable a persistence mode with the presentation network busses.

In normal operation, security credential verification and an access request are required each time the vehicle is powered on before access to the presentation network busses may be granted. The example ECU 202 may also operate in a persistence mode that when enabled will allow access to the presentation network busses when the vehicle is powered on without security credential verification and an access request for a limited number of power off, power on cycles. This may be useful when access to a presentation network bus may be desired to troubleshoot problems manifesting during power on.

After security credential verification and access to a presentation network bus is granted, a user with sufficient rights may request the persistence mode and set a persistence count. Once the persistence mode is entered, at the next power on and after a power off, the microprocessor 236 decrements the persistence count and checks the value of the persistence count. If the persistence count is non-zero, the microprocessor 236 may enable the last presented presentation network busses. After the maximum number of power off, power on cycles allowed by the persistence count, the persistence mode will be automatically disabled.

The microprocessor 236 is configured to allow a user to reset the persistence count to zero at any time to disable the persistence mode at the next power on. The microprocessor 236 is configured to not allow a user to increment the persistence count without first passing security credential verification to determine if the user has sufficient rights to use the persistence mode. While the presentation network busses are used to provide listen-only access to in-vehicle networks, the ECU 202 may use one or both diagnostic CAN busses available through the DLC to receive data and requests from a user.

The example system 200 illustrates providing privileged, listen-only access to up to two CAN busses at a time. Other example systems may provide access to three or more networks at a time. As an example, other systems may provide three or more presentation network busses and/or may provide three or more presentation circuits.

Figure 3:
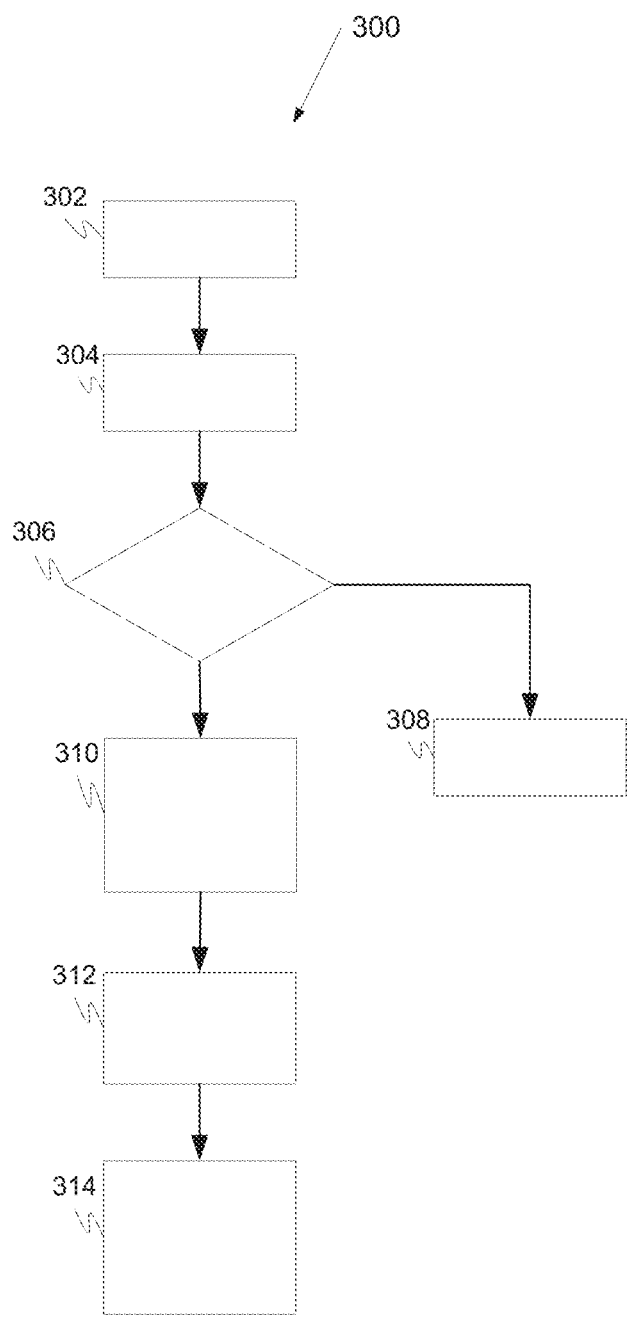
FIG. 3 is a process flow chart depicting an example process for enabling a presentation channel, in accordance with some embodiments.

FIG. 3 is a process flow chart depicting an example process 300 for enabling a presentation channel. The example process begins with the vehicle being powered on (operation 302). After the vehicle is powered on, a secured login procedure is initiated that includes a security check (operation 304). The secured login procedure may involve invoking a PKI system and verifying a user's credentials using a certificate verification system. As part of the security check, a determination is made regarding whether a user passes a credential check (decision 306). If the credential check is not passed (no at decision 306), access to the presentation network busses is denied (operation 308). If the credential check is passed (yes at decision 306), The user is assigned to an access class based on its security credentials (operation 310). The access class determines what kind of listen-only access rights the user may have to the presentation network busses. As an example, one user class may have access to the persistence mode while another user class may not. A diagnostic service request to enable one or both presentation channels must be received before any of the presentation channels become active (operation 312). After a diagnostic service request to enable the presentation channels is received, the presentation channels are enabled based on the determined access class (operation 314).

Figure 4:
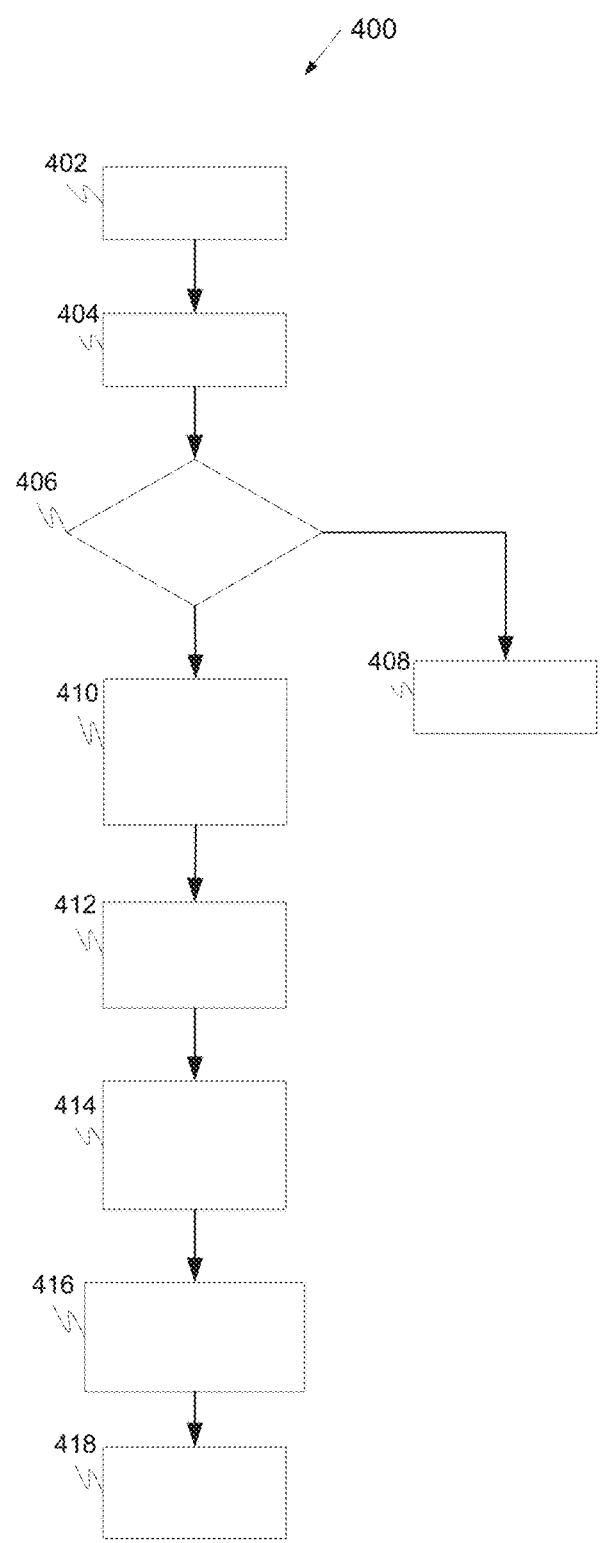
FIG. 4 is a process flow chart depicting an example process for selecting which in-vehicle networks are mirrored onto a presentation channel, in accordance with some embodiments.

FIG. 4 is a process flow chart depicting an example process 400 for selecting which in-vehicle networks are mirrored onto a presentation channel. The example process begins with the vehicle being powered on (operation 402). After the vehicle is powered on, a secured login procedure is initiated that includes a security check (operation 404). The secured login procedure may involve invoking a PKI system and verifying a user's credentials using a certificate verification system. As part of the security check, a determination is made regarding whether a user passes a credential check (decision 406). If the credential check is not passed (no at decision 406), access to the presentation network busses is denied (operation 408). If the credential check is passed (yes at decision 406), the user is assigned to an access class based on its security credentials (operation 410). The access class determines what kind of listen-only access rights the user may have to the presentation network busses. As an example, one user class may have access to the persistence mode while another user class may not. A diagnostic service request to enable one or both presentation channels must be received before any of the presentation channels become active (operation 412). After a diagnostic service request to enable the presentation channels is received, the presentation channels are enabled based on the determined access class (operation 414). After the presentation channels are enabled, a user may change the in-vehicle network busses presented or mirrored onto the presentation channels. A channel selection request (or second diagnostic service request) is received from a user (operation 416). After receiving the channel selection request, the selected channels are mirrored onto the presentation network busses (418).

Figure 5:
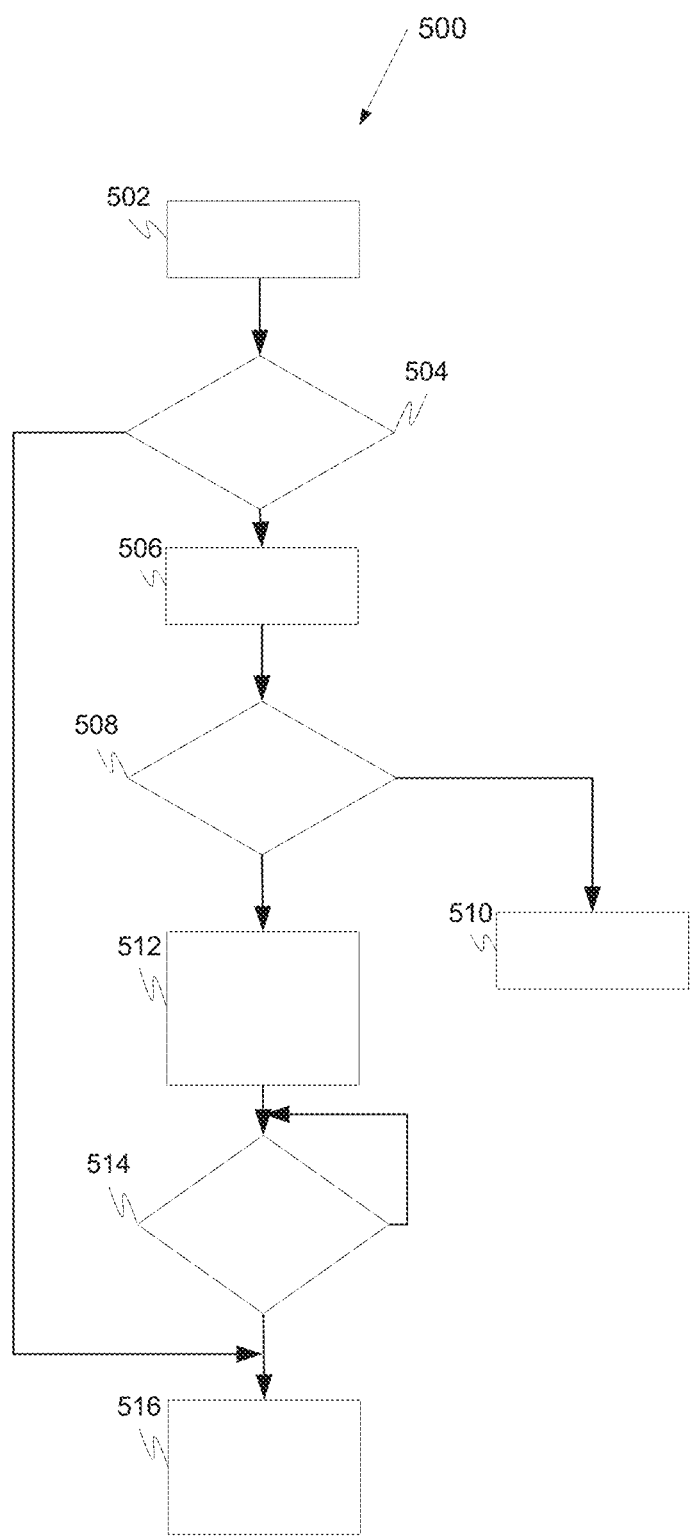
FIG. 5 is a process flow chart depicting an example process for enabling a presentation channel via a persistence mode, in accordance with some embodiments.

FIG. 5 is a process flow chart depicting an example process 500 for enabling a presentation channel via a persistence mode. The example process begins with the vehicle being powered on (operation 502). A determination is made regarding whether the persistence mode had been enabled prior to the last power down (decision 504). If the persistence mode had been enabled (yes at decision 504), the presentation network busses are enabled for output based on the access class determined during the last security check (operation 516). If the persistence mode had not been enabled (no at decision 504), a secured login procedure is initiated that includes a security check (operation 506). The secured login procedure may involve invoking a PKI system and verifying a user's credentials using a certificate verification system. As part of the security check, a determination is made regarding whether a user passes a credential check (decision 508). If the credential check is not passed (no at decision 508), access to the presentation network busses is denied (operation 510). If the credential check is passed (yes at decision 508), the user is assigned to an access class based on its security credentials (operation 512). A request to enable one or both presentation channels must be received before any of the presentation channels become active. A determination is made regarding whether a diagnostic service request to enable the presentation channels is received (decision 514). If a diagnostic service request to enable the presentation channels has not yet been received (no at decision 514), the presentation channels are not enabled. When a diagnostic service request to enable the presentation channels is received (yes at decision 514), the presentation channels are enabled based on the access class (operation 516).

Figure 6:
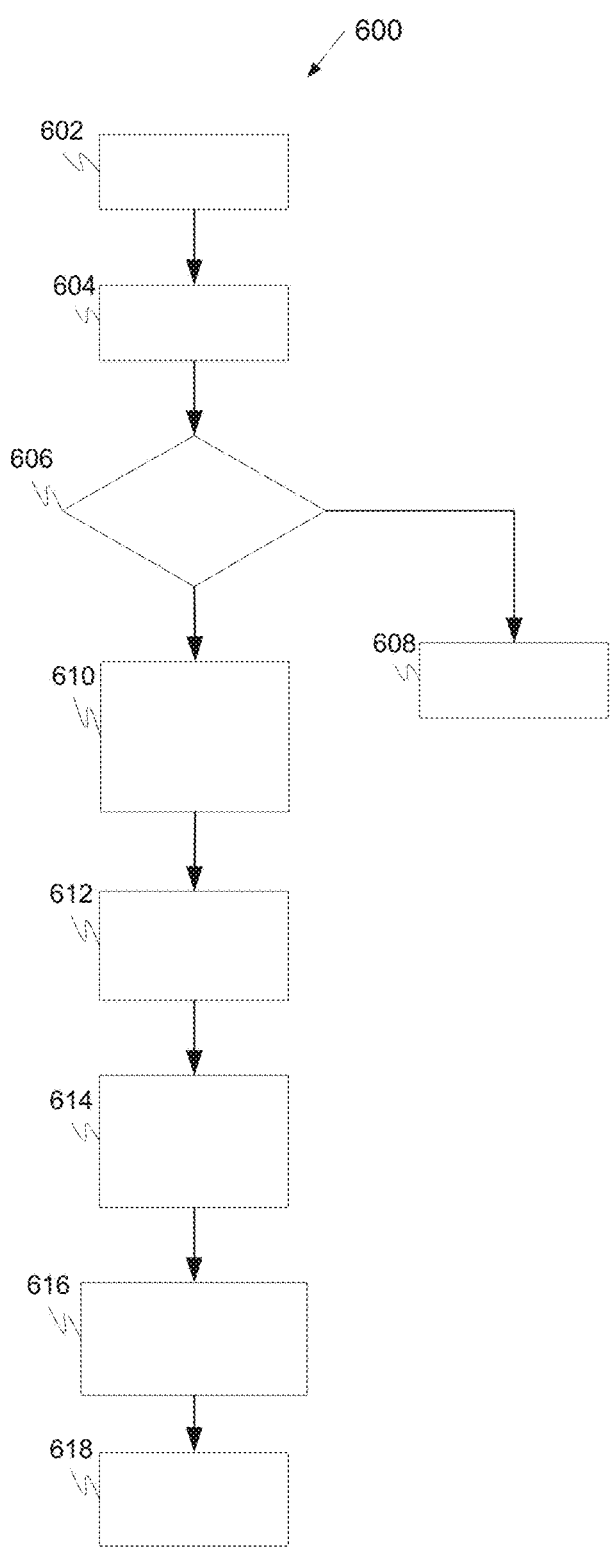
FIG. 6 is a process flow chart depicting an example process for enabling the persistence mode, in accordance with some embodiments.

FIG. 6 is a process flow chart depicting an example process 600 for enabling the persistence mode. The example process begins with the vehicle being powered on (operation 602). After the vehicle is powered on, a secured login procedure is initiated that includes a security check (operation 604). The secured login procedure may involve invoking a PKI system and verifying a user's credentials using a certificate verification system. As part of the security check, a determination is made regarding whether a user passes a credential check (decision 606). If the credential check is not passed (no at decision 606), access to the presentation network busses is denied (operation 608). If the credential check is passed (yes at decision 606), the user is assigned to an access class based on its security credentials (operation 610). The access class determines what kind of listen-only access rights the user may have to the presentation network busses. As an example, one user class may have access to the persistence mode while another user class may not. A diagnostic service request to enable one or both presentation channels must be received before any of the presentation channels become active (operation 612). After a diagnostic service request to enable the presentation channels is received, the presentation channels are enabled based on the determined access class (operation 614). A diagnostic service request for enabling the persistence mode and a persistence count may be received after the credential verification has been passed and the presentation channels have been enabled (operation 616). The persistence count can be used to determine the number of subsequent power on cycles during which credential verification will not be required. After successful receipt of the diagnostic service request for enabling the persistence mode and the entry of the persistent count, the persistence mode is enabled (operation 618).

Figure 7:
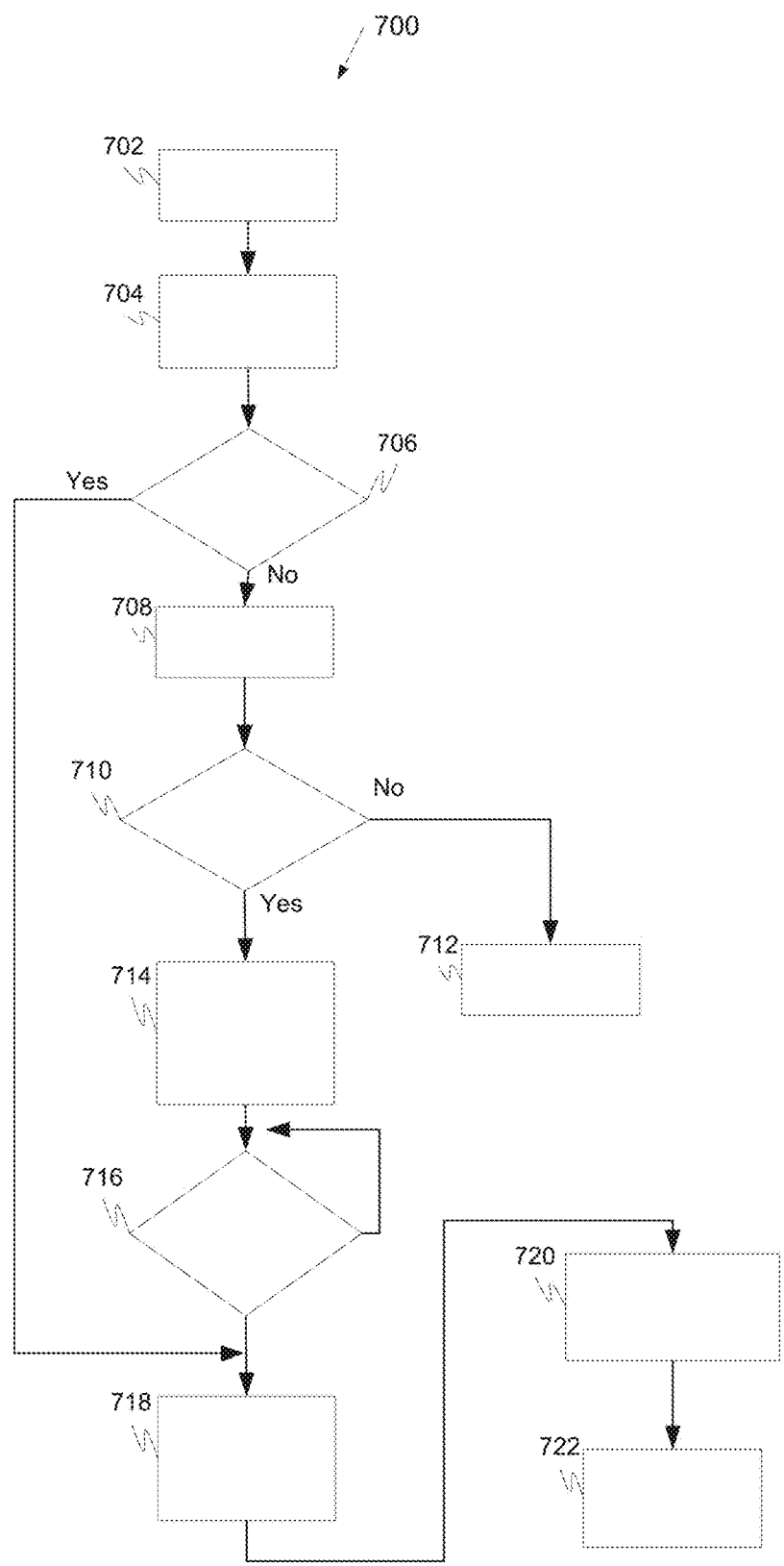
FIG. 7 is a process flow chart depicting another example process for enabling a presentation channel via a persistence mode, in accordance with some embodiments.

FIG. 7 is a process flow chart depicting another example process 700 for enabling a presentation channel via a persistence mode. The example process begins with the vehicle being powered on (operation 702). The persistence count is decremented (operation 704). A determination is made regarding whether the persistence count is greater than zero (decision 706). If the persistence count is greater than zero (yes at decision 706), the presentation network busses are enabled for output based on the access class determined during the last security check (operation 718). If the persistence count is equal to zero (no at decision 706), a secured login procedure is initiated that includes a security check (operation 708). The secured login procedure may involve invoking a PKI system and verifying a user's credentials using a certificate verification system. As part of the security check, a determination is made regarding whether a user passes a credential check (decision 710). If the credential check is not passed (no at decision 710), access to the presentation network busses is denied (operation 712). If the credential check is passed (yes at decision 710), the user is assigned to an access class based on its security credentials (operation 714). A diagnostic service request to enable one or both presentation channels must be received before any of the presentation channels become active. A determination is made regarding whether a diagnostic service request to enable the presentation channels is received (decision 716). If a diagnostic service request to enable the presentation channels has not yet been received (no at decision 716), the presentation channels are not enabled. When a diagnostic service request to enable the presentation channels is received (yes at decision 716), the presentation channels are enabled based on the access class (operation 718).

The example process 700 may also allow for the persistence mode to be disabled at the next power on regardless of the current persistence count. A diagnostic service request to disable the persistence mode may be received after it has been determined that the persistence mode is on and the presentation channels are enabled (operation 720). In response to the request to disable the persistence mode via the diagnostic service request, the persistent count is reset to a zero value. (operation 722). Resetting the persistence count to zero disables the persistence mode at the next power on.

Described herein are apparatus, systems, techniques and articles for allowing listen-only access to and monitoring of in-vehicle networks. The described apparatus, systems, techniques and articles allow listen-only access through a credentialed control system. A physical layer is implemented in a central gateway module that, when enabled, only allows listen-only capabilities to a few in-vehicle networks at a time at the DLC. Control algorithms are provided to enable privileged, listen-only access to the in-vehicle networks. The monitoring circuitry, once enabled and latched, may impose little or no processing or maintenance throughput demands on the host microprocessor. Monitoring can be made to remain active over a configurable but limited number of power on cycles.

In one embodiment, a method of providing privileged access to an internal vehicle communication network is provided. The method comprises providing a presentation network bus capable of providing listen-only access to a subset of in-vehicle networks, verifying access credentials in a security system configured to control access to the presentation network bus by using a combination of symmetric and asymmetric cryptographic systems, receiving a diagnostic service request after the access credentials have been verified to enable the presentation network bus for listen-only access to the subset of in-vehicle networks, and enabling the presentation network bus for the listen-only access in response to receipt of the diagnostic service request.

These aspects and other embodiments may include one or more of the following features. Providing a presentation network bus may comprise providing listen-only access to a first one of the networks on a first pin in the diagnostic link connector (DLC) of a vehicle and providing listen-only access to a second one of the networks on a second pin in the DLC. Providing a presentation network bus may comprise providing circuitry that is capable of transmitting data but not capable of receiving data. Providing a presentation network bus may comprise providing selection circuitry for selectively outputting one of the networks. The method may further comprise receiving a second diagnostic service request after the presentation network bus has been enabled that identifies a different network for listen-only access. The method may further comprise enabling a persistence mode after the access credentials have been verified wherein the presentation network bus will be enabled for listen-only access after a power-down and power-up cycle without re-verifying access credentials in the security system after the power-down. Enabling a persistence mode may comprise receiving a diagnostic service request that requests that the persistence mode be enabled and includes a persistence count value that identifies the number of power-down and power-up cycles during which the presentation network bus will be enabled for listen-only access without re-verifying access credentials. The persistence count value may automatically decrement after each power-down and power-up cycle. The method may further comprise disabling the persistence mode after receiving a diagnostic service request to disable the persistence mode regardless of the persistence count value. Disabling the persistence mode may comprise resetting the persistence count value to zero. The persistence count value may only be set to a value greater than zero during an operating cycle in which the access credentials have been verified in the security system. The method may further comprise providing one of a plurality of different listen-only access levels to the in-vehicle networks based on the received access credentials.

In another embodiment, a system for providing privileged access to an internal vehicle communication network is provided. The system comprises a presentation network bus configured to provide listen-only access to a subset of in-vehicle networks, a security system configured to enable access to the presentation network bus by verifying access credentials, and a diagnostic service system configured to control access to the presentation network bus. The diagnostic service system is configured to receive a diagnostic service request after the access credentials have been verified to enable the presentation network bus for listen-only access to the subset of networks. The presentation network bus may be enabled for the listen-only access after credential verification by the security system and in response to receipt of a diagnostic service request from the diagnostic service system requesting that the presentation network bus be enabled.

These aspects and other embodiments may include one or more of the following features. The presentation network bus may be configured to provide a listen-only connection to one of the in-vehicle serial networks on a first set of pins of a diagnostic link connector (DLC) and a listen-only connection to a second one of the in-vehicle serial networks on a second set of pins of the DLC. The system may further comprise a presentation circuitry configured to mirror an in-vehicle network onto the presentation network bus. The presentation circuitry may be configured to transmit data onto the presentation network bus from the in-vehicle network for listen-only access to the in-vehicle network but not capable of receiving data from the presentation network bus to transmit onto the in-vehicle network. The presentation circuitry may comprise a network transceiver that is configured to transmit data onto the presentation network bus from the in-vehicle network for listen-only access to the in-vehicle network but not capable of receiving data from the presentation network bus to transmit onto the in-vehicle network. The presentation circuitry may be configured to selectively output one of a plurality of network receive lines of the in-vehicle serial networks to the presentation network bus. The presentation circuitry may comprise selection circuitry configured to selectively output one of a plurality of network receive lines of the in-vehicle serial networks to the presentation network bus. The security system may use a combination of symmetric and asymmetric cryptographic systems. The diagnostic service system may be further configured to receive a second diagnostic service request after the presentation network bus has been enabled that identifies a network for listen-only access. The diagnostic service system may be further configured to enable a persistence mode after the access credentials have been verified wherein the presentation network bus will be enabled for listen-only access after a power-down and power-up cycle without re-verifying access credentials in the security system after the power-down. The diagnostic service system may be further configured to receive a diagnostic service request that requests that the persistence mode be enabled and includes a persistence count value that identifies the number of power-down and power-up cycles during which the presentation network bus will be enabled for listen-only access without re-verifying access credentials. The persistence count value may automatically decrement after each power-down and power-up cycle. The diagnostic service system may be further configured to disable the persistence mode after receiving a diagnostic service request to disable the persistence mode regardless of the persistence count value. The diagnostic service system may be further configured to disable the persistence mode by resetting the persistence count value to zero. The persistence count value may only be set to a value greater than zero during an operating cycle in which the access credentials have been verified in the security system. The security system may be further configured to provide one of a plurality of different listen-only access levels to the networks based on the received access credentials.

In another embodiment, a gateway module in a vehicle is provided. The gateway module comprises presentation circuitry configured to mirror a selected in-vehicle network onto a presentation network bus. The presentation circuitry comprises selection circuitry configured to selectively output one of a plurality of network receive lines from in-vehicle serial networks to the presentation network bus and transceiver circuitry that is configured to transmit data onto the presentation network bus from the selected in-vehicle network for listen-only access to the in-vehicle network and prevent data from the presentation network bus from being transmitted onto the selected in-vehicle network. The gateway module further comprises a security interface configured to enable access to the presentation network bus by verifying access credentials using a combination of symmetric and asymmetric cryptographic systems and a diagnostic service interface configured to control access to the presentation network bus wherein the diagnostic service interface is configured to receive a diagnostic service request after the access credentials have been verified to enable the presentation network bus for listen-only access to the selected in-vehicle network.

These aspects and other embodiments may include one or more of the following features. The diagnostic service interface may be further configured to receive a second diagnostic service request after the presentation network bus has been enabled that identifies a network for listen-only access. The diagnostic service interface may be further configured to enable a persistence mode after the access credentials have been verified wherein the presentation network bus will be enabled for listen-only access after a power-down and power-up cycle without re-verifying access credentials in the security system after the power-down. The diagnostic service interface may be further configured to receive a diagnostic service request that requests that the persistence mode be enabled and includes a persistence count value that identifies the number of power-down and power-up cycles during which the presentation network bus will be enabled for listen-only access without re-verifying access credentials. The persistence count value may automatically decrement after each power-down and power-up cycle. The diagnostic service interface may be further configured to disable the persistence mode after receiving a diagnostic service request to disable the persistence mode regardless of the persistence count value. The diagnostic service interface may be further configured to disable the persistence mode by resetting the persistence count value to zero. The persistence count value may only be set to a value greater than zero during an operating cycle in which the access credentials have been verified in the security system. The security system may be further configured to provide one of a plurality of different listen-only access levels to the networks based on the received access credentials.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. Method of providing privileged access to an internal vehicle communication network, the method comprising:
   providing a presentation network bus capable of providing listen-only access to a subset of in-vehicle networks, the presentation network bus connected to circuitry configured to selectively transmit network traffic from one of a plurality of the in-vehicle networks to the presentation network bus and permanently configured to permanently prevent data from the presentation network bus from being received by any of the plurality of in-vehicle networks;
   verifying access credentials in a security system configured to control access to the presentation network bus by using a combination of symmetric and asymmetric cryptographic systems;

receiving a diagnostic service request after the access credentials have been verified to enable the presentation network bus for listen-only access to the subset of in-vehicle networks;

enabling the presentation network bus for the listen-only access in response to receipt of the diagnostic service request by enabling the circuitry to selectively transmit network traffic from one of the plurality of in-vehicle networks to the presentation network bus;

enabling a persistence mode after the access credentials have been verified wherein the presentation network bus will be enabled for listen-only access after a power-down and power-up cycle without re-verifying access credentials in the security system after the power-down; and providing one of a plurality of different listen-only access levels to the in-vehicle networks based on the received access credentials.

2. The method of claim 1, further comprising receiving a second diagnostic service request after the presentation network bus has been enabled that identifies a different network for listen-only access.

3. The method of claim 1, wherein enabling a persistence mode comprises receiving a diagnostic service request that requests that the persistence mode be enabled and includes a persistence count value that identifies the number of power-down and power-up cycles during which the presentation network bus will be enabled for listen-only access without re-verifying access credentials.

4. The method of claim 3, wherein the persistence count value automatically decrements after each power-down and power-up cycle.

5. The method of claim 3, further comprising disabling the persistence mode after receiving a diagnostic service request to disable the persistence mode regardless of the persistence count value.

6. The method of claim 5, wherein disabling the persistence mode comprises resetting the persistence count value to zero.

7. The method of claim 3, wherein the persistence count value may only be set to a value greater than zero during an operating cycle in which the access credentials have been verified in the security system.

8. A system for providing privileged access to an internal vehicle communication network, the system comprising:
a presentation network bus configured to provide listen-only access to a subset of in-vehicle networks;
a presentation circuit connected to the presentation network bus, the presentation circuit is configured to selectively transmit network traffic from one of a plurality of the in-vehicle networks to the presentation network bus and permanently configured to permanently prevent data from the presentation network bus from being received by any of the plurality of in-vehicle networks;
a security system comprising one or more processors configured by programming instructions on non-transient computer readable media to enable access to the presentation network bus by verifying access credentials using a combination of symmetric and asymmetric cryptographic systems; and
a diagnostic service system comprising one or more processors configured by programming instructions on non-transient computer readable media to control access to the presentation network bus, the diagnostic service system configured to receive a diagnostic service request after the access credentials have been verified and to enable the presentation network bus for listen-only access to the subset of networks by enabling the presentation circuit to selectively transmit network traffic from one of the plurality of in-vehicle networks to the presentation network bus;
wherein the presentation network bus may be enabled for the listen-only access after credential verification by the security system and in response to receipt of a diagnostic service request from the diagnostic service system requesting that the presentation network bus be enabled;
wherein the diagnostic service system is further configured to enable a persistence mode after the access credentials have been verified wherein the presentation network bus will be enabled for listen-only access after a power-down and power-up cycle for a limited number of cycles without re-verifying access credentials in the security system after the power-down; and
wherein the diagnostic service system is further configured to provide one of a plurality of different listen-only access levels to the in-vehicle networks based on the received access credentials.

9. The system of claim 8, wherein the presentation network bus is configured to provide a listen-only connection to one of the in-vehicle serial networks on a first pin of a diagnostic link connector (DLC) and a listen-only connection to a second one of the in-vehicle serial networks on a second pin of the DLC.

10. The system of claim 8, wherein the presentation circuit comprises selection circuitry and a network transceiver coupled between the presentation network bus and the subset of in-vehicle networks, the selection circuitry configured to selectively output network traffic from one of the plurality of in-vehicle networks to the network transceiver, the network transceiver configured transmit network traffic received from the selection circuitry to the presentation network bus and permanently configured to permanently prevent data from the presentation network bus from being received by the selection circuitry.

11. The system of claim 8, wherein the presentation circuit comprises a network transceiver that is configured to transmit data onto the presentation network bus from one of the in-vehicle networks for listen-only access to the in-vehicle network but not capable of receiving data from the presentation network bus to transmit onto the in-vehicle network.

12. The system of claim 8, wherein the presentation circuit comprises selection circuitry configured to selectively output one of a plurality of network receive lines of the in-vehicle serial networks to the presentation network bus.

13. The system of claim 8, wherein the diagnostic service system is further configured to receive a diagnostic service request that requests that the persistence mode be enabled and includes a persistence count value that identifies the number of power-down and power-up cycles during which the presentation network bus will be enabled for listen-only access without re-verifying access credentials.

14. The system of claim 13, wherein the persistence count value may only be set to a value greater than zero during an operating cycle in which the access credentials have been verified in the security system.

15. A gateway module in a vehicle comprising:
presentation circuitry configured to mirror a selected in-vehicle network onto a presentation network bus, the presentation circuitry comprising selection circuitry and transceiver circuitry coupled between the presentation network bus and the selected in-vehicle network:

the selection circuitry is configured to selectively output network traffic from the selected in-vehicle network to the transceiver circuitry; and the transceiver circuitry is configured to transmit network traffic received from the selection circuitry to the presentation network bus for listen-only access to the selected in-vehicle network and permanently configured to permanently prevent data from the presentation network bus from being received by the selection circuitry and transmitted onto the selected in-vehicle network;

a security interface configured to enable access to the presentation network bus by verifying access credentials using a combination of symmetric and asymmetric cryptographic systems; and a diagnostic service interface configured to control access to the presentation network bus, the diagnostic service interface configured to receive a diagnostic service request after the access credentials have been verified to enable the presentation network bus for listen-only access to the selected in-vehicle network by enabling the presentation circuitry to selectively transmit network traffic from the selected in-vehicle network to the presentation network bus;

wherein the diagnostic service interface is further configured to enable a persistence mode after the access credentials have been verified wherein the presentation network bus will be enabled for listen-only access after a power-down and power-up cycle for a limited number of cycles without re-verifying access credentials in the security system after the power-down; and wherein the diagnostic service interface is further configured to provide one of a plurality of different listen-only access levels to the in-vehicle networks based on the received access credentials.

16. The gateway module of claim 15, wherein the diagnostic service interface is further configured to receive a diagnostic service request that requests that the persistence mode be enabled and includes a persistence count value that identifies the number of power-down and power-up cycles during which the presentation network bus will be enabled for listen-only access without re-verifying access credentials.

17. The gateway module of claim 16, wherein the persistence count value automatically decrements after each power-down and power-up cycle.

18. The gateway module of claim 16, wherein the diagnostic service interface is further configured to disable the persistence mode after receiving a diagnostic service request to disable the persistence mode regardless of the persistence count value.

19. The gateway module of claim 18, wherein the diagnostic service interface is configured to reset the persistence count value to zero when disabling the persistence mode.

20. The gateway module of claim 16, wherein the persistence count value may only be set to a value greater than zero during an operating cycle in which the access credentials have been verified in the security system.

* * * * *